UNITED STATES PATENT OFFICE.

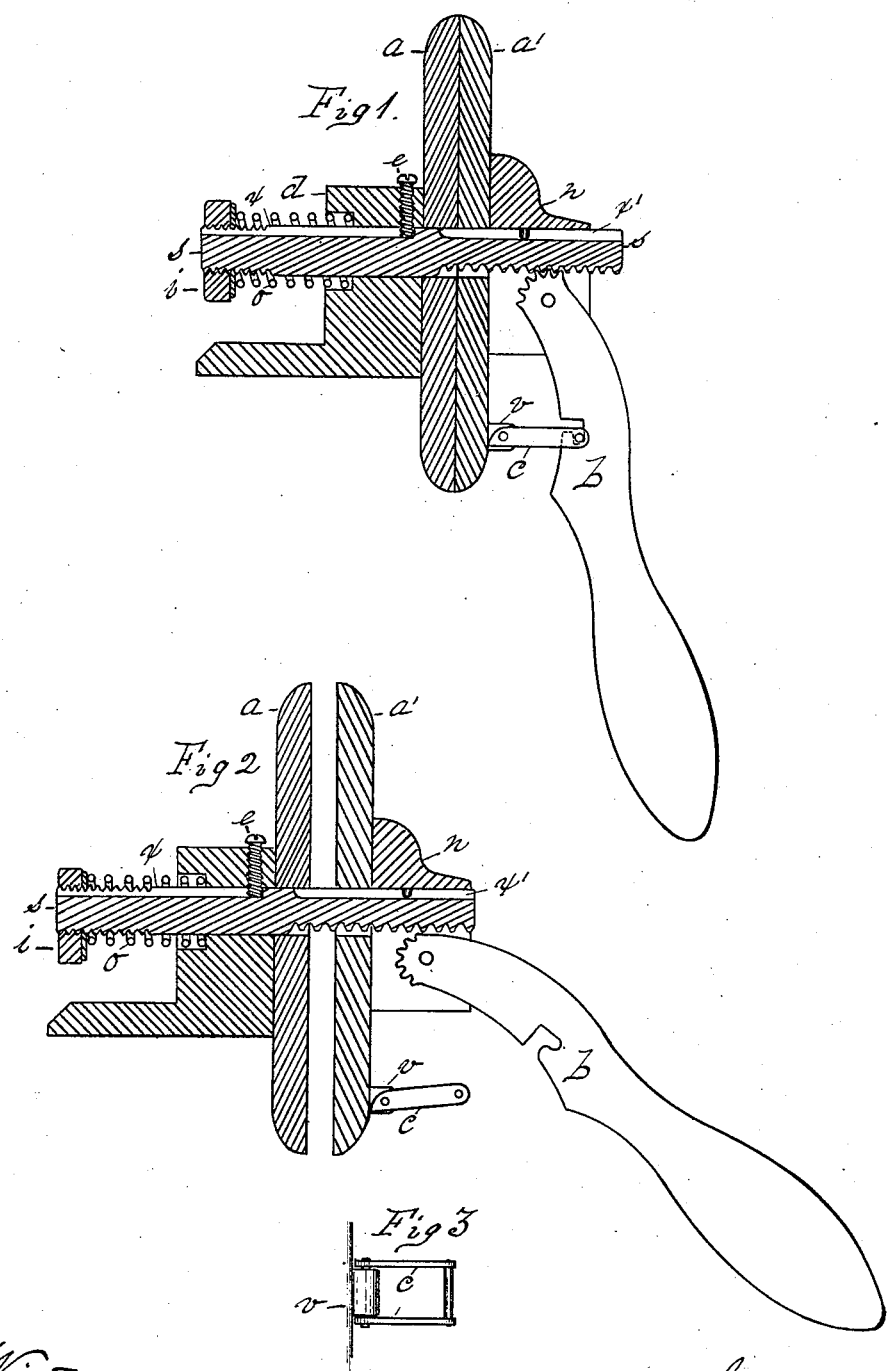

WILLIAM H. JOHNSON, OF SPRINGFIELD, MASSACHUSETTS.

SAW-CLAMP.

SPECIFICATION forming part of Letters Patent No. 244,251, dated July 12, 1881.

Application filed April 29, 1881. (No model.)

*To all whom it may concern:*

Be it known that I, WILLIAM H. JOHNSON, a citizen of the United States, residing at Springfield, in the county of Hampden and State of Massachusetts, have invented new and useful Improvements in Saw-Clamps, of which the following is a specification.

This invention is in the nature of an improvement upon my patent of January 4, 1881, and relates to details of construction of devices by which the "serrated bolt $d$," therein described, is made to be automatically adjustable through the clamp-plates, and the "serrated lever" shown in said patent is provided with positive locking devices to supersede a spring, the object being to adapt the clamping devices to receive a thick or thin saw and automatically to adjust themselves to it, and to provide such improved locking devices for the clamp-lever as will secure it rigidly and firmly.

In the drawings forming part of this specification, Figure 1 is a vertical section of my improved saw-clamp, but showing a side elevation of the locking-lever and locking-link. Fig. 2 is a like view, but showing the lever and link as they appear when the clamp-plates are unlocked. Fig. 3 is a plan view of the locking-link.

In the drawings, $a$ is the rear clamp-plate fixed to a flanged hub, $d$.

$s$ is a serrated slotted bolt fitted to a hole pierced transversely through hub $d$ and plate $a'$.

$o$ is a spiral spring fitting over the rear end of bolt $s$, one end of which enters a countersunk recess on the rear side of hub $d$, as shown.

$i$ is a nut screwed onto the end of bolt $s$, and compresses spring $o$ in such a way as to draw said bolt forcibly rearward against the end of a screw, $e$, in hub $d$, which enters a slot, $x$, on the upper side of said bolt. Said bolt has also a second slot, $x'$, formed in its upper side, into which a pin set in the hub $n$ of the front clamp-plate, $a'$, projects and prevents the latter plate from turning on said bolt. A projecting boss, $v$, is made upon plate $a'$, to which is pivoted the locking-link $c$, which is adapted to engage in a hook-shaped cut in lever $b$, as shown in Fig. 1. Said lever $b$ corresponds to the serrated lever mentioned in said patent, and is pivoted to hub $n$ on plate $a'$, in a slot below bolt $s$, substantially as described therein.

The operation of the improved saw-clamp is as follows: The plate $a'$ and lever $b$ can be drawn off from bolt $s$ when said lever is turned to the position shown in Fig. 2, and a saw be hung on said bolt lying back against plate $a$. Plate $a'$ is now replaced upon said bolt and pressed up against the saw, and lever $b$ is swung down toward the locking-link $c$ to hook it, the serrated end of said lever meanwhile engaging with the serrated side of bolt $s$ and forcing plate $a'$ against the saw. It will be seen that if said saw is too thick to allow lever $b$ to swing and be hooked onto link $c$, and if bolt $s$ be rigidly fixed in hub $d$, the saw could not be clamped between plates $a$ and $a'$, but by forcing the lever toward link $c$ bolt $s$ will compress the spring $o$ sufficiently to permit lever $b$ to hook onto link $c$, and so fasten the saw firmly between plates $a$ and $a'$.

What I claim as my invention is—

The combination, with the clamp-plates $a$ and $a'$, lever $b$, and bolt $s$, provided with the nut $i$, of the spring $o$ and link $c$, substantially as and for the purpose set forth.

W. H. JOHNSON.

Witnesses:
H. A. CHAPIN,
J. D. GARFIELD.